United States Patent [19]  
Tsuchiya

[11] Patent Number: 5,055,953  
[45] Date of Patent: Oct. 8, 1991

[54] CASSETTE LOADING APPARATUS HAVING A GUIDE MEMBER WITH WORM UNIT FOR REDUCTION OF DRIVE TORQUE

[75] Inventor: Yuzo Tsuchiya, Fukaya, Japan

[73] Assignee: Kabushiki Kaisha Toshiba, Kawasaki, Japan

[21] Appl. No.: 457,976

[22] Filed: Dec. 27, 1989

[30] Foreign Application Priority Data

Dec. 28, 1988 [JP] Japan ................. 63-333590

[51] Int. Cl.$^5$ ........................................... G11B 5/008
[52] U.S. Cl. ................... 360/96.5; 360/93; 360/96.1
[58] Field of Search .................. 360/93, 85, 95, 96.5, 360/96.1, 96.6; 242/200–201

[56] References Cited

U.S. PATENT DOCUMENTS

| 4,059,245 | 11/1977 | Hirose | 242/200 |
|---|---|---|---|
| 4,060,840 | 11/1977 | Umeda | 360/85 |
| 4,122,506 | 10/1978 | Kubo et al. | 360/95 |
| 4,133,497 | 1/1979 | Rothlisberger | 242/200 |
| 4,264,937 | 4/1981 | Kabacinkski | 360/85 |
| 4,319,292 | 3/1982 | Katoh | 360/96.5 |
| 4,370,682 | 1/1983 | Katoh | 360/71 |
| 4,423,445 | 12/1983 | Okada et al. | 360/96.5 |
| 4,511,940 | 4/1985 | Yamaguchi et al. | 360/105 |
| 4,577,246 | 3/1986 | Matsuki | 360/96.5 X |
| 4,628,383 | 12/1986 | Miyamoto | 360/96.5 |
| 4,642,714 | 2/1987 | Miyamoto | 360/96.5 |
| 4,723,177 | 2/1988 | Ahn | 360/93 |
| 4,768,113 | 8/1988 | Sato | 360/96.5 |
| 4,809,100 | 2/1989 | Tanaka et al. | 360/96.1 |
| 4,825,322 | 4/1989 | Kunze | 360/96.3 |
| 4,837,646 | 6/1989 | Nagai et al. | 360/85 |
| 4,851,938 | 7/1989 | Inami | 360/96.5 |
| 4,858,042 | 8/1989 | Ito et al. | 360/96.5 |
| 4,866,549 | 9/1989 | Terayama et al. | 360/96.5 |
| 4,872,076 | 10/1989 | Uehara et al. | 360/96.5 |
| 4,918,549 | 4/1990 | Katono et al. | 360/96.5 |
| 4,930,720 | 6/1990 | Hwang | 360/96.5 |

FOREIGN PATENT DOCUMENTS

| 0177026 | 2/1985 | European Pat. Off. |  |
|---|---|---|---|
| 0219041 | 7/1986 | European Pat. Off. |  |
| 55-113165 | 9/1980 | Japan | 360/96.6 |
| 58-164050 | 9/1983 | Japan | 360/93 |
| 61-210552 | 9/1986 | Japan |  |

Primary Examiner—A. J. Heinz  
Assistant Examiner—Alfonso Garcia  
Attorney, Agent, or Firm—Cushman, Darby & Cushman

[57] ABSTRACT

A cassette holder holds a cassette, and is disposed to be substantially horizontally movable. A loading mechanism includes a guide member for guiding the cassette holder to load or unload the cassette, and a worm wheel for driving the guide member. A worm unit includes a worm, having first and second ends, meshed with the worm wheel, a rotating member coaxially mounted to the first end of the worm, and thrust and radial bearings coaxially mounted between the worm and the rotating member, the worm being driven in accordance with a transmission of rotation from a drive source to the rotating member. A mounting mechanism, to which the worm unit is mounted, includes a first elastic support member for elastically supporting the second end of the worm, and a second elastic support member for elastically supporting the radial bearing.

3 Claims, 11 Drawing Sheets

CASSETTE LOADING APPARATUS HAVING A GUIDE MEMBER WITH WORM UNIT FOR REDUCTION OF DRIVE TORQUE

BACKGROUND OF THE INVENTION

1. Field of the Invention

The present invention generally relates to a cassette loading apparatus and, more particularly, to a cassette loading apparatus for substantially horizontally conveying a tape cassette used in a magnetic recording/reproducing apparatus such as a video tape recorder (to be referred to as a VTR hereinafter), and loading the cassette in a tape drive unit.

2. Description of the Related Art

In a conventional cassette loading apparatus in a recent VTR, when a tape cassette is substantially horizontally inserted in a cassette holder, a front loading mechanism is operated to convey the cassette holder. When the cassette holder reaches a portion on a tape drive unit, the tape cassette which is moved downward and held is loaded in the tape drive unit. At this time, a cassette lid of the tape cassette is opened, and a tape extraction member of the tape loading mechanism is inserted inside the tape. The tape loading mechanism then performs tape loading.

In an ejection mode, an operation opposite to the above-mentioned loading operation is performed to move the cassette outside the cassette holder, i.e., unloading is performed.

In such a cassette loading apparatus, a demand has arisen for achieving a simple arrangement, highly reliable operation control, and simplification of manufacturing and assembly operations.

To meet the above demand, a drive mechanism for conveying a cassette holder through a worm and a worm wheel, to which a drive force of a drive motor is transmitted through a belt transmission mechanism, is exemplified. More specifically, in the worm and worm wheel, if a front loading mechanism is operated, and an unloading operation of the cassette holder which holds the tape cassette is erroneously and forcibly stopped by a user, a very large torque acts on the worm, and a cling between the worm and the worm wheel or the worm support unit may often occur. In this case, in order to release a cling of the worm, a drive motor is driven in the reverse direction, and the worm is reversed.

In the above-mentioned cassette loading apparatus, however, a very large torque is required to release a cling of the worm, unlike in a drive operation. Therefore, unless a large cassette loading drive motor having a torque larger than a starting torque is used, it is difficult to assure a reliable operation. Therefore, cost and power consumption are undesirably increased. In addition, the worm must be assembled with the worm wheel through a bearing while it is axially supported in the thrust and radial directions. Therefore, the assembly and mounting operations are complicated, and hence cost is further increased.

As described above, in the conventional cassette loading apparatus, due to a worm cling, unless a drive motor having a large drive force is used, it is difficult to assure a reliable operation, and assembly and mounting operations of the worm are complicated, thus causing high cost and high power consumption.

SUMMARY OF THE INVENTION

It is, therefore, an object of the present invention to provide a new and improved cassette loading apparatus with a worm cling protection in which a unit mechanism is employed to prevent, in advance, a cling of a worm to which a drive force of a drive motor is transmitted through a drive force transmission mechanism, so that reliable operation control using a drive motor having a small drive force can be realized, and assembly and mounting operations of the worm can be simplified, thus achieving preferable cost and power consumption.

According to the present invention, there is provided a cassette loading apparatus comprising:

a cassette holder, disposed to be substantially horizontally movable, for holding a cassette;

loading means including a guide member for guiding the cassette holder to load or unload the cassette, and a worm wheel for driving the guide member;

a worm unit, including a worm meshed with the worm wheel, a rotating member coaxially mounted at one end of the worm, and thrust and radial bearings coaxially mounted between the worm and the rotating member, the worm being driven in accordance with the transmission of rotation from a drive source to the rotating member; and mounting means, to which the worm unit is mounted, including a first elastic support member for elastically supporting the other end of the worm, and a second elastic support member for elastically supporting the radial bearing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DESCRIPTION OF THE PREFERRED EMBODIMENTS

An embodiment of the present invention will be described hereinafter with reference to the accompanying drawings.

Figure 1A:
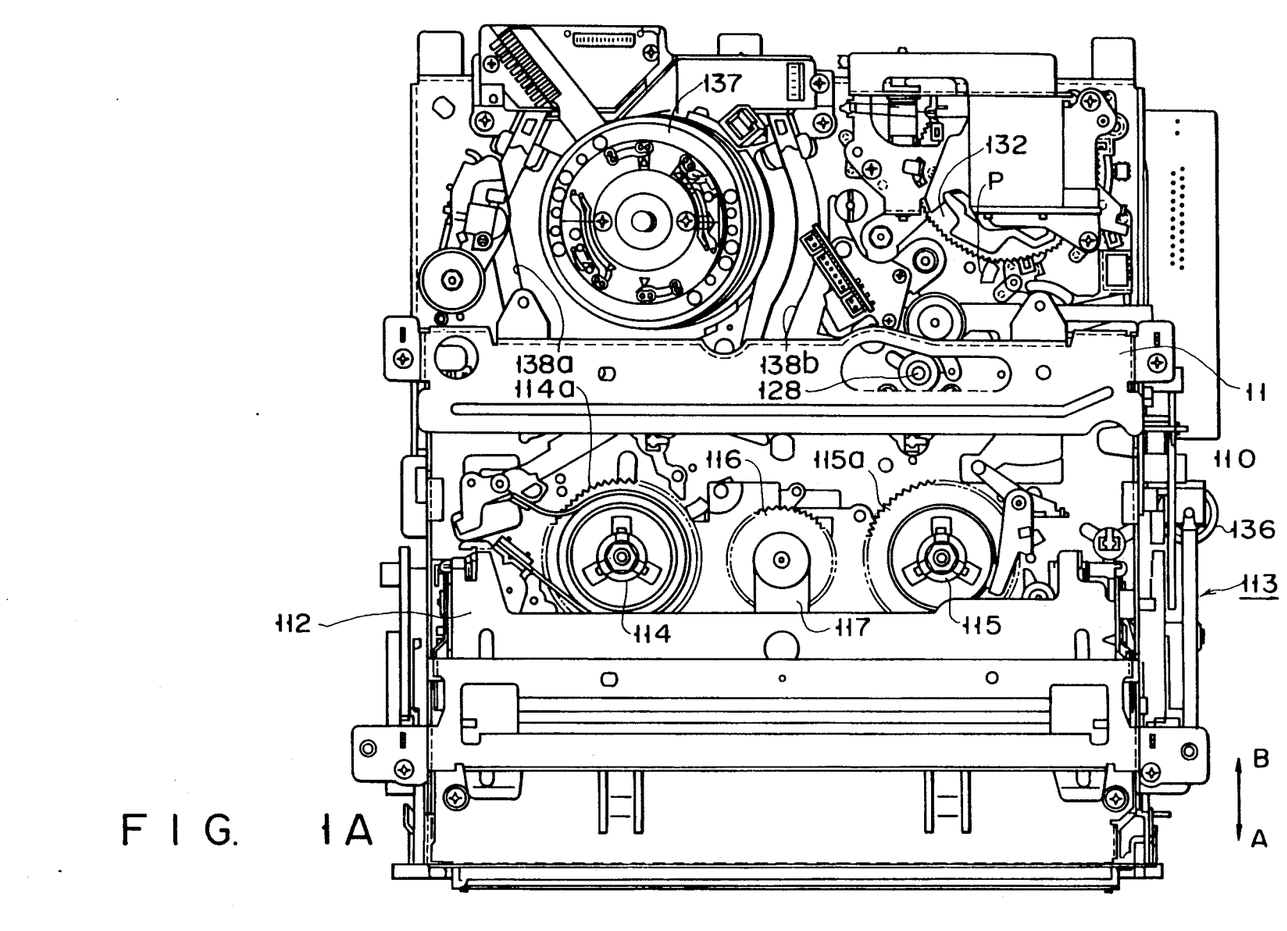
FIGS. 1A to 1C are plan, bottom, and side views of a VTR to which a cassette loading apparatus according to an embodiment of the present invention is applied, respectively.
Figure 1B:
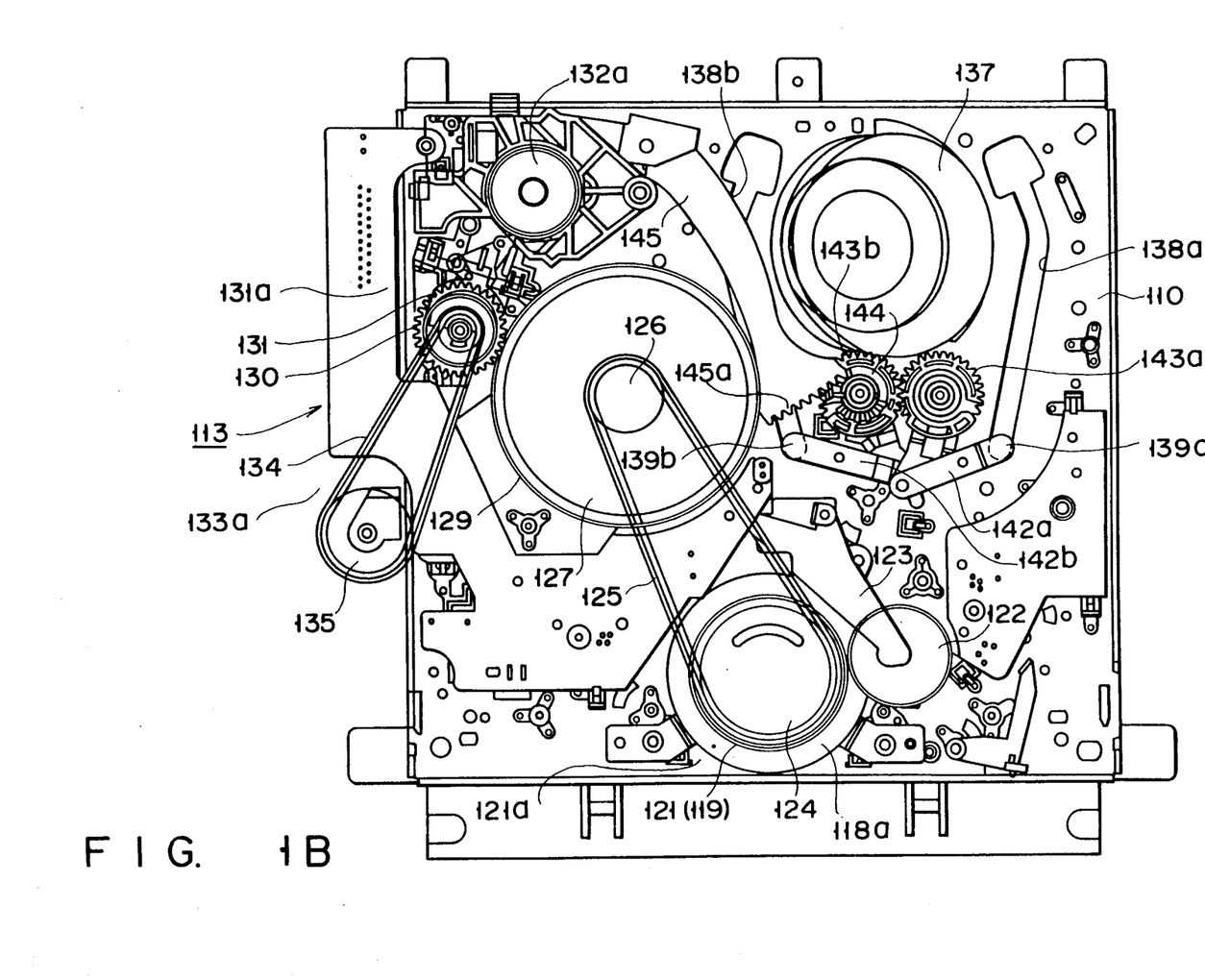
Figure 1C:
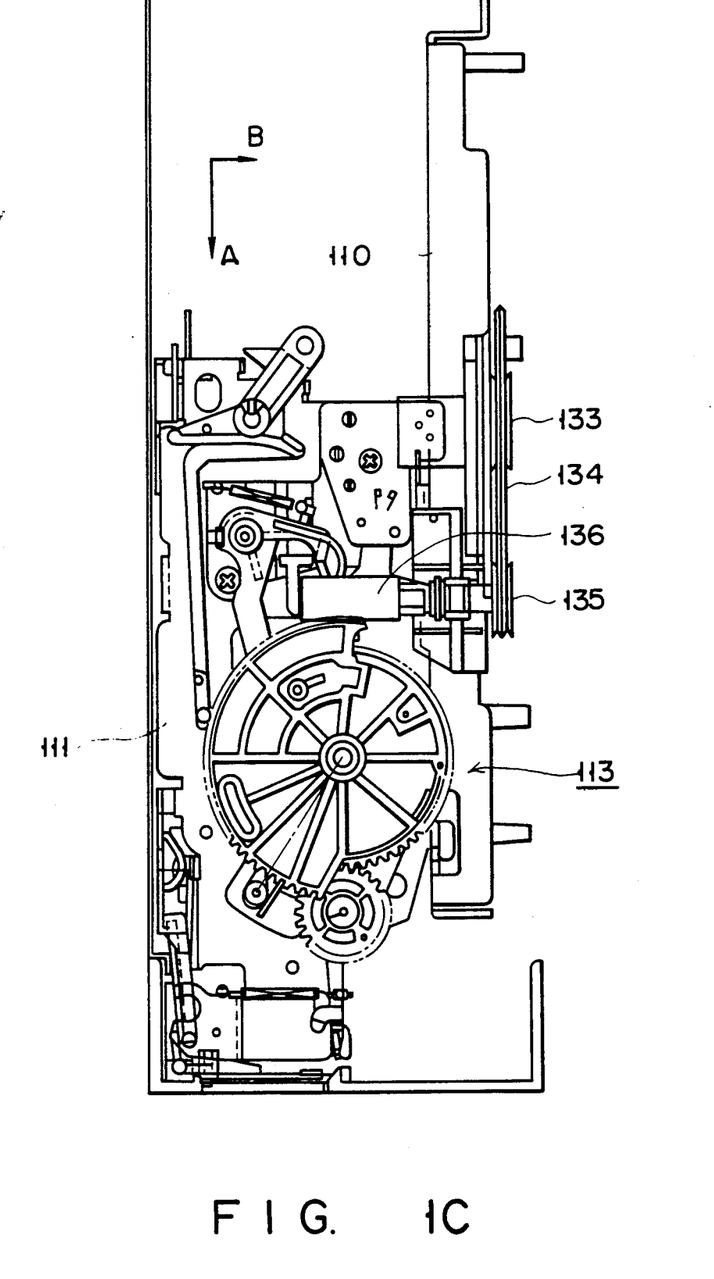

FIGS. 1A to 1C show a VTR to which an embodiment of the present invention is applied, in which FIG. 1A is a plan view, FIG. 1B is a bottom view, and FIG. 1C is a side view. More specifically, reference numeral 110 denotes a main chassis. A frame member 111 is mounted at one end of the main chassis 110. A cassette holder 112 is supported by the frame member 111 to be movable in a direction indicated by an arrow A or B. A tape cassette C (not shown in FIGS. 1A to 1C for the sake of convenience, but shown in FIG. 4) is inserted in the cassette holder 112 at a frontmost cassette insertion position in the direction indicated by the arrow A. Upon cassette insertion, a front loading mechanism 113 serving as a main part of a cassette loading apparatus (to be described later) of the present invention is driven and moved in the direction indicated by the arrow B, and the tape cassette C is loaded on tape supply and tape take-up reel hubs 114 and 115 in a tape drive unit.

Figure 2:
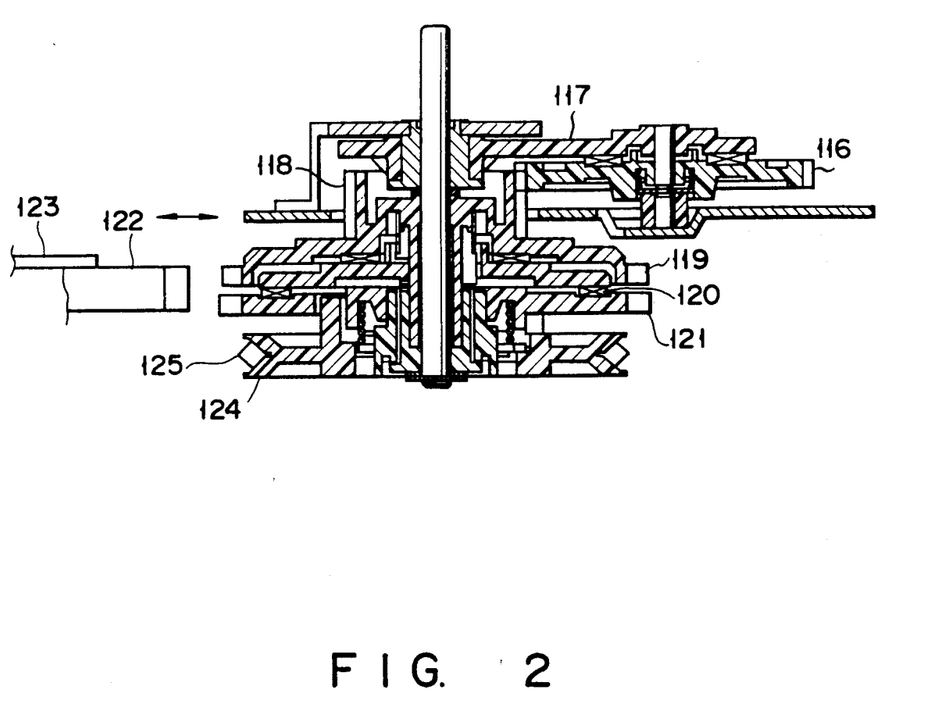
FIG. 2 is a sectional view showing a detailed arrangement of a clutch gear mechanism shown in FIG. 1B.

Gears 114a and 115a are mounted on the reel hubs 114 and 115, respectively. A drive gear 116 is disposed at an intermediate portion between these gears 114a and 115a to constitute a tape travel drive mechanism. The drive gear 116 is supported at one end of a swinging member 117. As shown in FIG. 2, a gear 118 is mounted at the other end of the swinging member 117, and is meshed with the drive gear 116. The gear 118 is coaxially arranged with a first gear 119 of a clutch gear mechanism 118a. The first gear 119 is disposed to overlap a second gear 121 through a friction member 120. A clutch switching gear 122 is arranged to detachably oppose the first and second gears 119 and 121. The gear 122 is pivotally arranged through a switching slider 123 interlocked with an operation mode switching mechanism, and is selectively meshed with the first or second gear 119 or 121, in response to the operation mode. A pulley 124 which constitutes a tape driving belt transmission mechanism 121a is coaxially arranged with the second gear 121 of these gears 119 and 121. A drive belt 125 is looped between the pulley 124 and a drive pulley 126 (FIG. 1B). The drive pulley 126 is fitted on a rotating shaft of a rotatable capstan motor 127. A capstan 128 is coaxially arranged with the capstan motor 127, and the drive force of the capstan 128 is transmitted to the pulley 124 via the drive belt 125. Then, the pulley 124 rotates one of the gears 114a and 115a of the reel hubs 114 and 115 through the gear 122, the first gear 119, the gear 118, the swinging member 117, and the drive gear 116. In addition, the tape is sandwiched between the capstan 128 and a pinch roller P, and is driven to travel.

Figure 3:
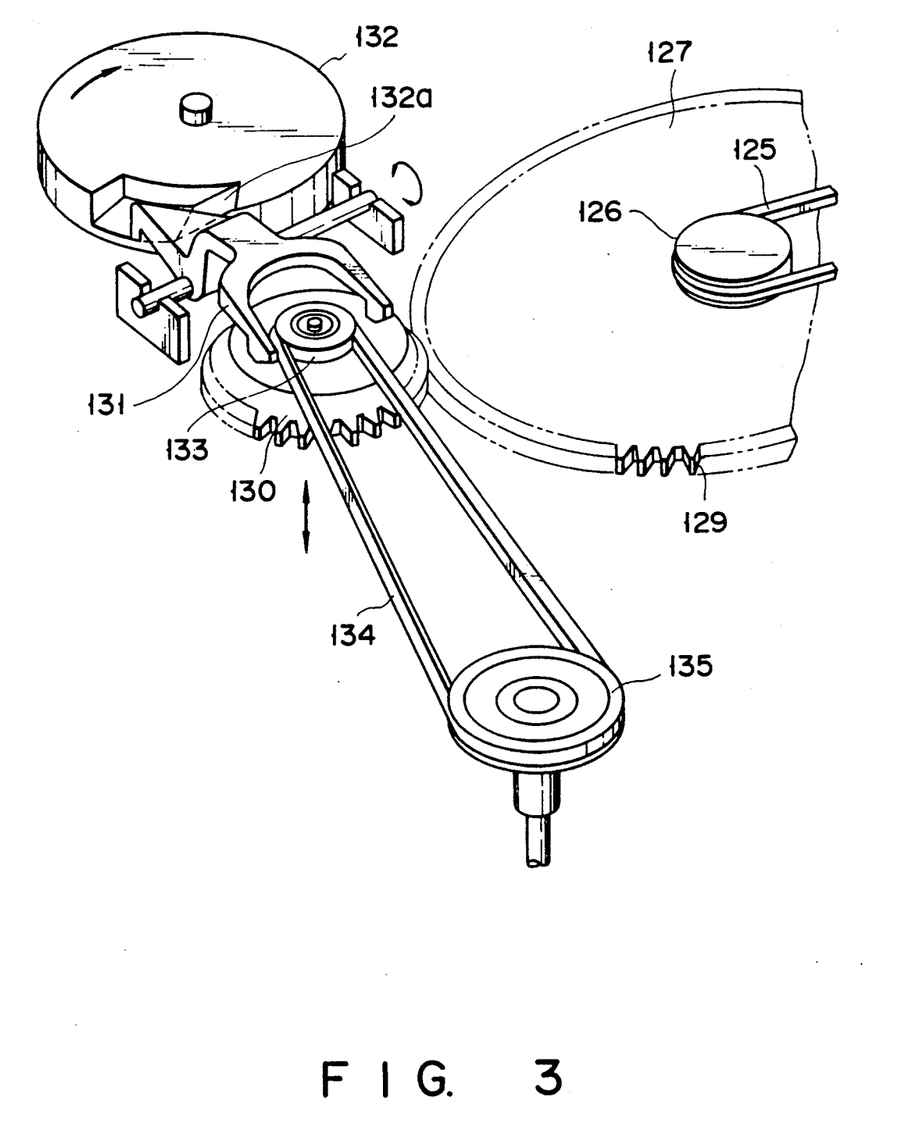
FIG. 3 is a perspective view showing a detailed arrangement of a mode switching mechanism and a belt transmission mechanism shown in FIG. 1B.

A drive gear 129 is fitted around a rotating member of the capstan motor 127, and a lift gear 130 is arranged to oppose the drive gear 129. The lift gear 130 is disposed to be movable in the axial direction of the main chassis 110 through a spring mechanism (not shown). One end of a pivotal switching lever 131 is engaged with the upper surface of the lift gear 130 (FIG. 3). The other end of the switching lever 131 is engaged with a first gear unit formed on one surface of a mode switching cam 132 in an operation mode switching mechanism 131a. The pivoting movement of the switching lever 131 is controlled through the mode switching gear 132.

In a cassette loading state, one end of the lever 131 is spaced apart from the lift gear 130, and the lift gear 130 is caused to move upward by the spring mechanism (not shown) to cause the lift gear 130 to mesh with the drive gear 129. In a cassette loading completion state, the operation is reversed, and the lift gear 130 is moved downward in the axial direction by lever 131 against a spring force of the spring mechanism (not shown) at one end of the lever 131 to be spaced apart from the drive gear 129. In addition, a pulley 133 is coaxially arranged within the lift gear 130, and a drive belt 134 which constitutes a cassette loading drive belt transmission mechanism 133a is looped between the pulley 133 and a pulley 135. The pulley 135 is coaxially arranged with a worm 136 (FIG. 1A) in the front loading mechanism 113. A rotational force of the capstan motor 127 is selectively transmitted to the pulley 133, the drive belt 134, the pulley 135, or the worm 136 in correspondence with the vertical movement of the lift gear 130 to drive and control the front loading mechanism 113, thus performing a loading operation of the cassette holder 112, as described above.

Figure 4:
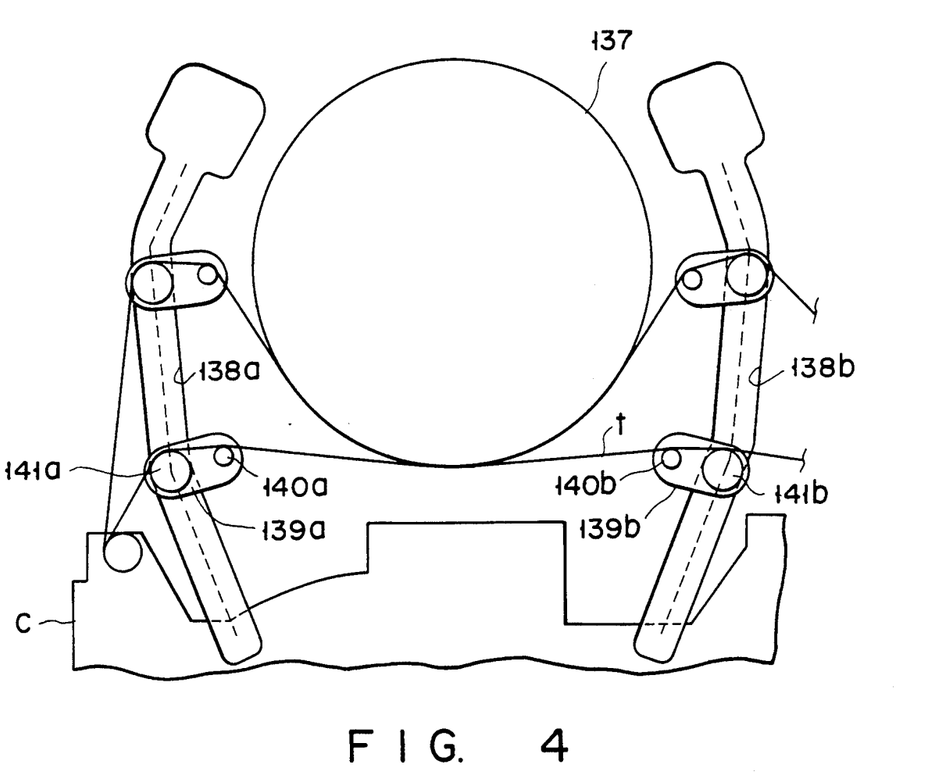
FIGS. 4 and 5 are perspective views showing a detailed arrangement of a tape loading state with respect to a cylinder and link mechanisms in FIGS. 1A and 1B.
Figure 5:
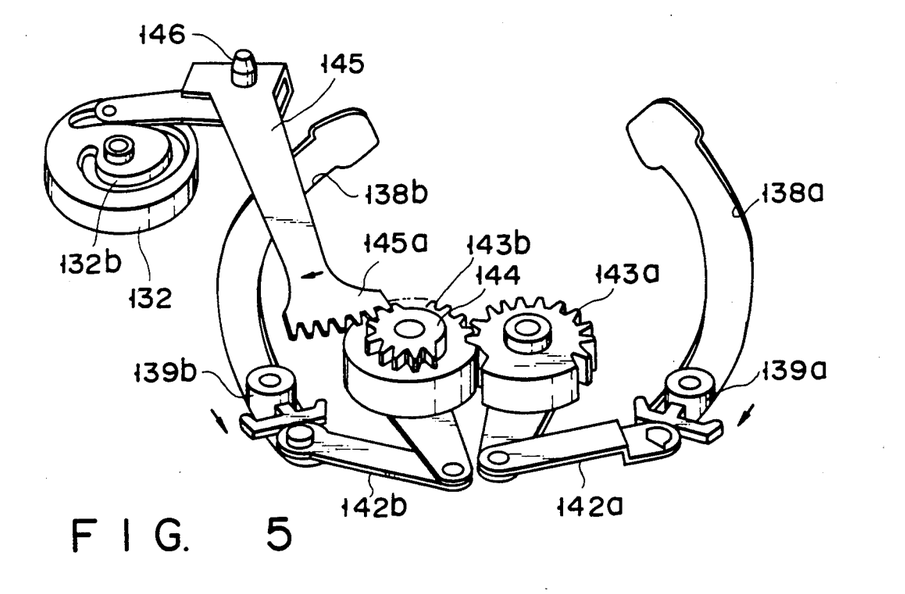

In addition, a helical scanning cylinder 137 on which a magnetic head is mounted is rotatably disposed on the main chassis 110 in correspondence with the frame member 111. First and second tape loading guide holes 138a and 138b are formed around the cylinder 137 in correspondence with the tape insertion and ejection ports, respectively. As shown in FIG. 4, first and second tape extraction members 139a and 139b are movably contained in the first and second guide holes 138a and 138b, respectively. Inclined posts 140a and 140b substantially parallel to the cylinder 137, and guide rollers 141a and 141b substantially perpendicular to the main chassis 110 are aligned on the first and second tape extraction members 139a and 139b, respectively. As shown in FIG. 5, one end of each of first and second link mechanisms 142a and 142b is coupled to a proximal end portion of the corresponding one of the first and second tape extraction members 139a and 139b. The other end of each of the first and second link mechanisms 142a and 142b is supported by the corresponding one of first and second drive gears 143a and 143b meshed with each other. A notch gear 144 is coaxially arranged with the second drive gear 143b of the first and second drive gears 143a and 143b, and a sector gear 145a formed at one end of a drive lever 145 is meshed with the notch gear 144. An intermediate portion of the drive lever 145 is pivotally supported by the main chassis 110 through a pivot shaft 146. The other end of the drive lever 145 is engaged with a second gear surface 132b of the mode switching gear 132. Therefore, the drive lever 145 is driven in synchronism with an operation of the mode switching gear 132 to drive the first and second tape extraction members 139a and 139b through the notch gear 144, the first and second drive gears 143a and 143b, and the first and second link mechanisms 142a and 142b, thus performing a tape loading operation.

A main part of a cassette loading apparatus according to the present invention applied to the abovementioned VTR will be described hereinafter.

Figure 6:
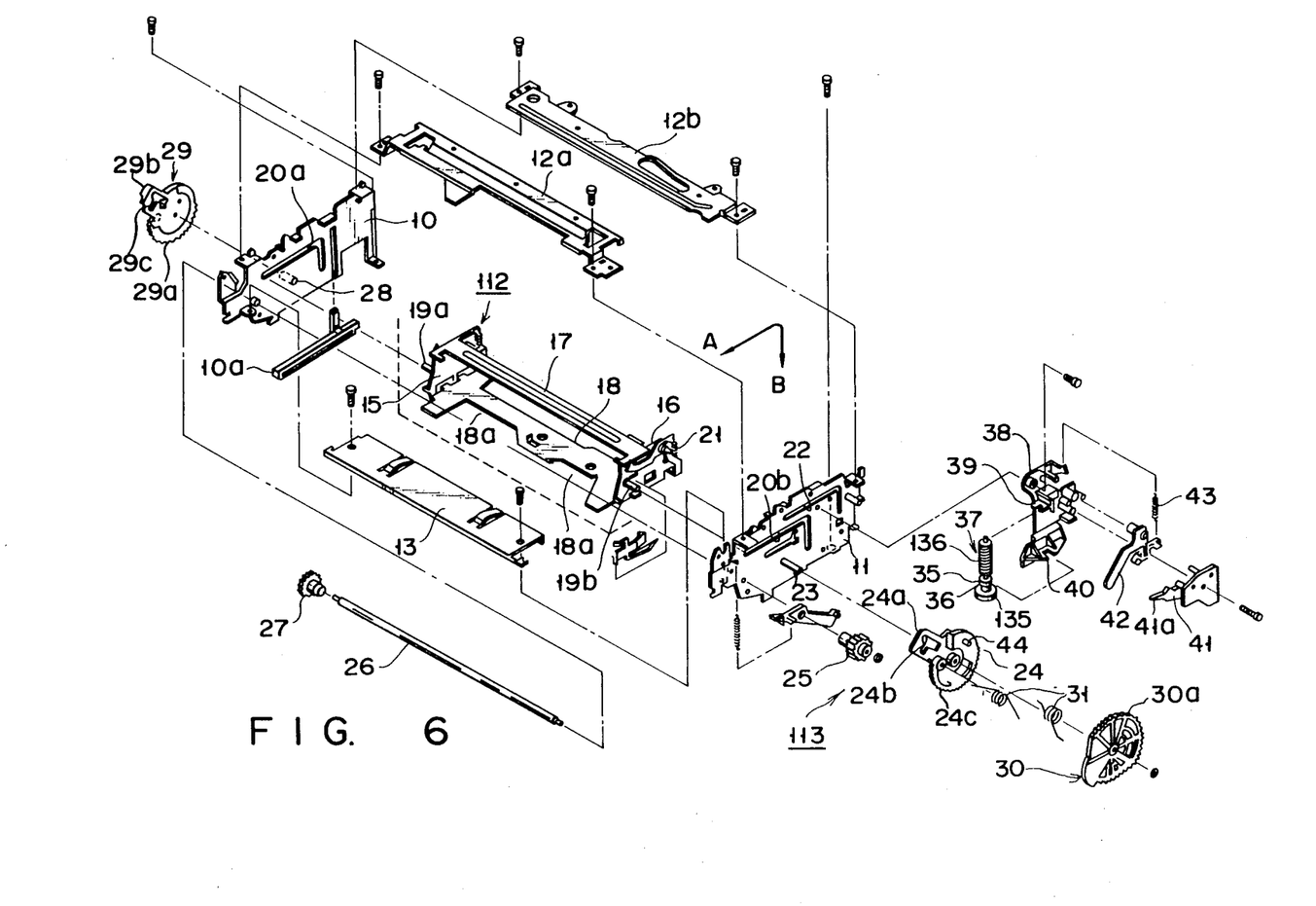
FIG. 6 is an exploded perspective view of a main part of the present invention.

FIG. 6 is an exploded perspective view showing the cassette loading apparatus disengaged from the VTR shown in FIGS. 1A to 1C. In FIG. 6, reference numerals 10 and 11 denote first and second support plates which form a supporting member. The first and second support plates 10 and 11 are assembled into a box-like shape through upper connecting plates 12a and 12b, and a lower connecting plate 13 also serving as a cassette guide. For example, an insertion/ejection lid (not shown) is pivotally disposed on the cassette loading side to be opened/closed. The cassette holder 112 is substantially horizontally disposed between the first and second support plates 10 and 11 to be movable in the direction indicated by the arrow A or B.

Guides 10a (only one is shown in FIG. 6) on which the cassette holder 112 is placed are mounted at lower portions of the first and second support plates 10 and 11, respectively.

Figure 7:
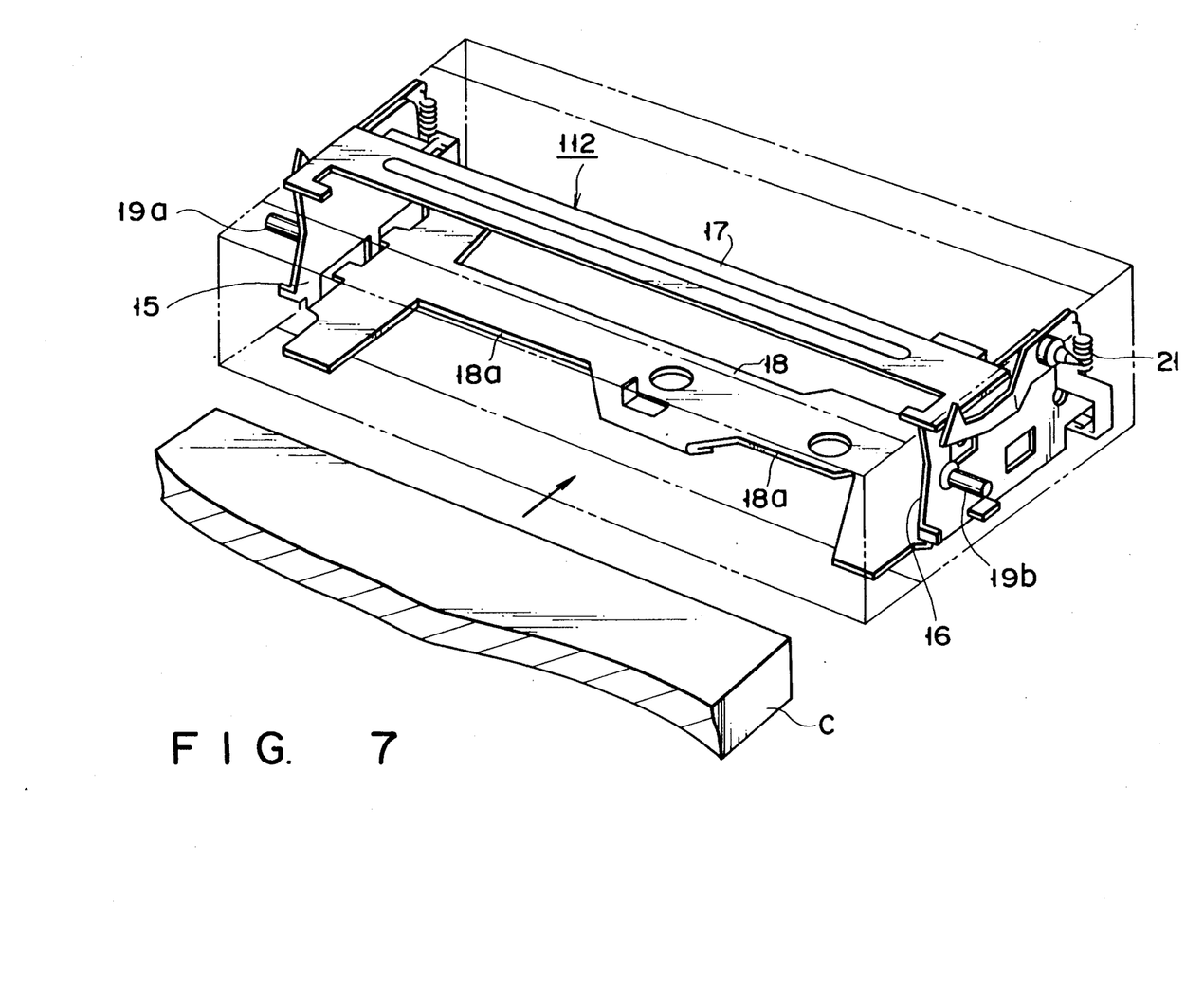
FIG. 7 is an assembled perspective view of a cassette holder shown in FIG. 6.

As shown in FIG. 7, in the cassette holder 112, first and second side plates 15 and 16 are assembled through upper and lower plates 17 and 18 into a substantially rectangular shape to form a cassette holder unit. Notch portions 18a are formed in the lower plate in correspondence with the tape drive unit shown in FIGS. 1A to 1C.

Guide pins 19a and 19b are substantially coaxially mounted outside the first and second side plates 15 and 16, respectively in the cassette holder 112. These guide pins 19a and 19b are inserted and guided in substantially L-shaped guide holes 20a and 20b formed in the first and second support plates 10 and 11, respectively. In addition, an engaging pin 21 is mounted on the second side plate 16 to be substantially parallel to the guide pin 19b. The engaging pin 21 is inserted and guided in a substantially L-shaped guide hole 22 formed in the second support plate 11. Therefore, the cassette holder 112 is substantially horizontally (in the direction indicated by the arrow B) slid and conveyed on the guide 10a from the cassette insertion position by the front loading mechanism 113 (to be described later) while being sandwiched between the first and second support plates 10 and 11. The conveyed cassette holder 112 is moved downward in the vertical direction on the tape drive unit (FIGS. 1A to 1C), and is guided to the cassette loading position. The holder 112 is further conveyed from the cassette loading position in a reverse direction (in the direction indicated by the arrow A), and is moved to a cassette unloading position at which the cassette can be ejected.

In addition as shown in FIG. 6, a shaft 23 extends horizontally from the outer surface of the second support plate 11, and a first loading gear 24 which constitutes the front loading mechanism 113 is rotatably supported by the shaft 23. An arm 24a is formed in the first loading gear 24, and an engaging hole 24b is formed in the arm 24a. The guide pin 19b extending from the second side plate 16 of the cassette holder 112 is inserted in the engaging hole 24b. In addition, a gear unit 24c is formed around the first loading gear 24, and a transmission gear 25 is meshed with the gear unit 24c. The transmission gear 25 is fitted on one end of a shaft 26 rotatably mounted between the first and second support plates 10 and 11, and a transmission gear 27 is fitted on the other end of the shaft 26. Therefore, the first loading gear 24 rotates the transmission gear 27 through the transmission gear 25 and the shaft 26 upon rotation thereof.

On the other hand, a shaft 28 extends horizontally from the base of first support plate 10, and a second loading gear 29 is rotatably supported by the shaft 28. A gear unit 29a is formed at the second loading gear 29, and the transmission gear 27 is meshed with the gear unit 29a. In addition, an arm 29b is formed on the second loading gear 29, and an engaging hole 29c is formed in the arm 29b. The guide pin 19a of the first side plate 15 in the cassette holder 112 is engaged with the engaging hole 29c. Therefore, the first and second loading gears 24 and 29 are simultaneously rotated through the transmission gear 25, the shaft 26, and the transmission gear 27. Upon rotation of these gears, the cassette holder 112 is conveyed and driven through the guide pins 19a and 19b.

Figure 8:
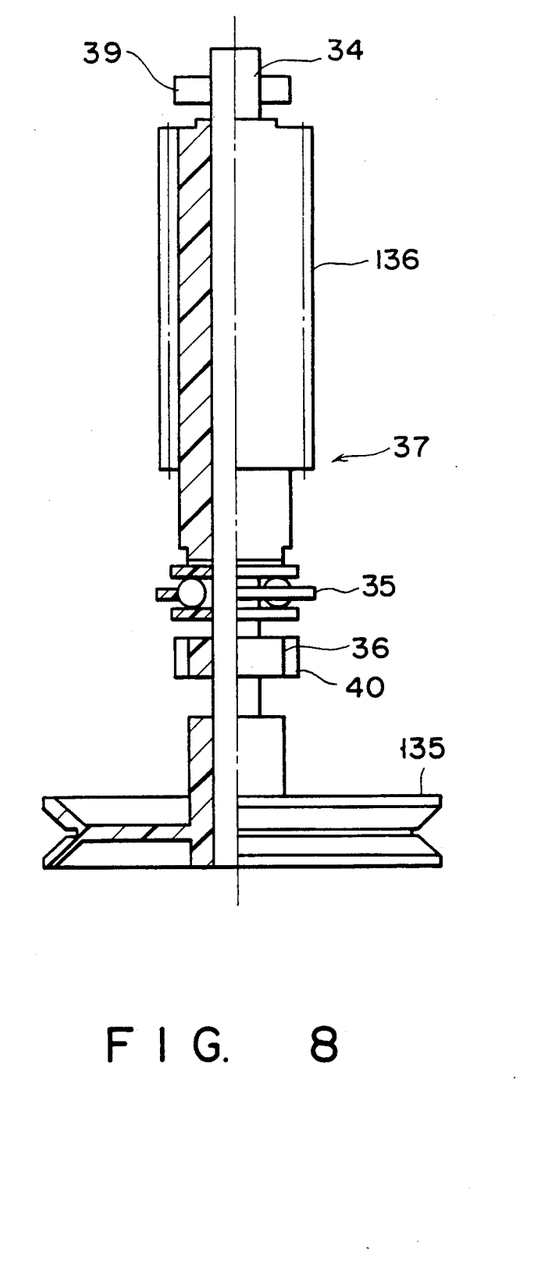
FIG. 8 is a sectional view showing a detailed arrangement of a worm unit shown in FIG. 6.

A third loading gear 30 is mounted on the shaft 23 of the second support plate 11 to overlap the first loading gear 24. These first and third loading gears 24 and 30 are elastically engaged with each other through a spring 31. A gear unit 30a is formed around the third loading gear 30 in correspondence with the gear unit 24c of the first loading gear 24, and the worm 136 is meshed with the gear unit 30a. As shown in FIG. 8, the pulley 135 which constitutes the belt transmission mechanism is coaxially fitted on one end of the worm 136 through a shaft 34. Thrust and radial bearings 35 and 36 which are to be generally referred to as a retainer assembly are axially supported at an intermediate portion of the shaft 34, thus forming an integrally assembled worm unit 37. The worm unit 37 is mounted on a mounting member 38, which is, in turn, mounted on the second support plate 11. First and second elastic support members 39 and 40 are formed in the mounting member 38 in correspondence with the upper end of the shaft 34 and the radial bearing 36, respectively. The upper end of the shaft 34 of the worm 136 and the radial bearing in the worm unit 37 are respectively mounted on the first and second elastic support members 39 and 40. Note that the friction coefficient of the thrust bearing 35 is set to be a small value compared with the friction coefficients of the first and second elastic support members 39 and 40 which hold the worm unit 37. Even if a large torque is applied to the worm 136, a cling between the worm 136 and the first and second elastic members 39 and 40 or the gear unit 30a of the third loading gear 30 which constitutes a worm wheel can be prevented. Note that, as described above, a rotational force of the capstan motor 127 is selectively transmitted to the pulley 135 through the transmission belt 134, and the rotational force is transmitted to the first and second loading gears 24 and 29 through the third loading gear 30.

Figure 9A:
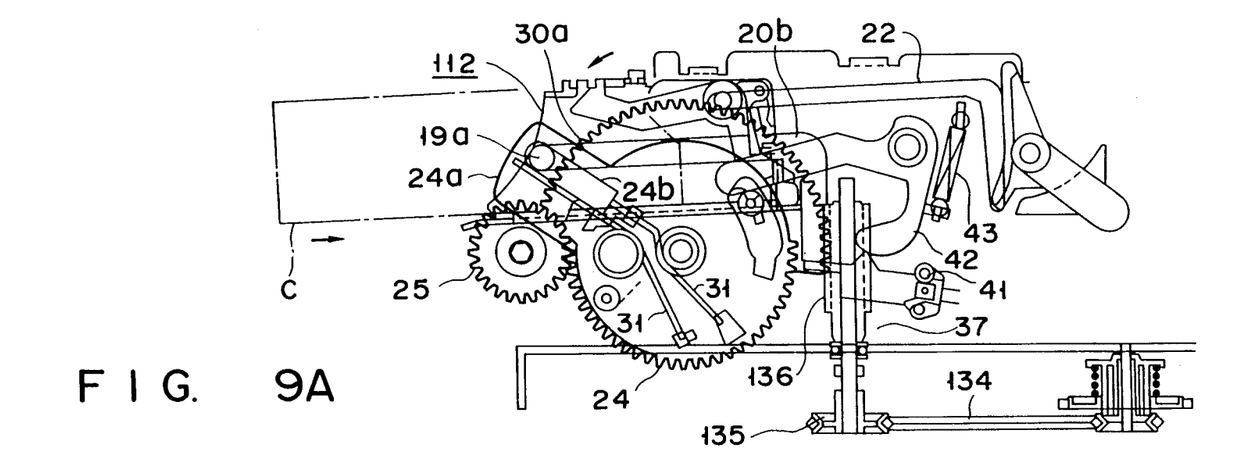
FIGS. 9A to 9D are views for explaining operation process of a cassette loading mechanism.
Figure 9B:
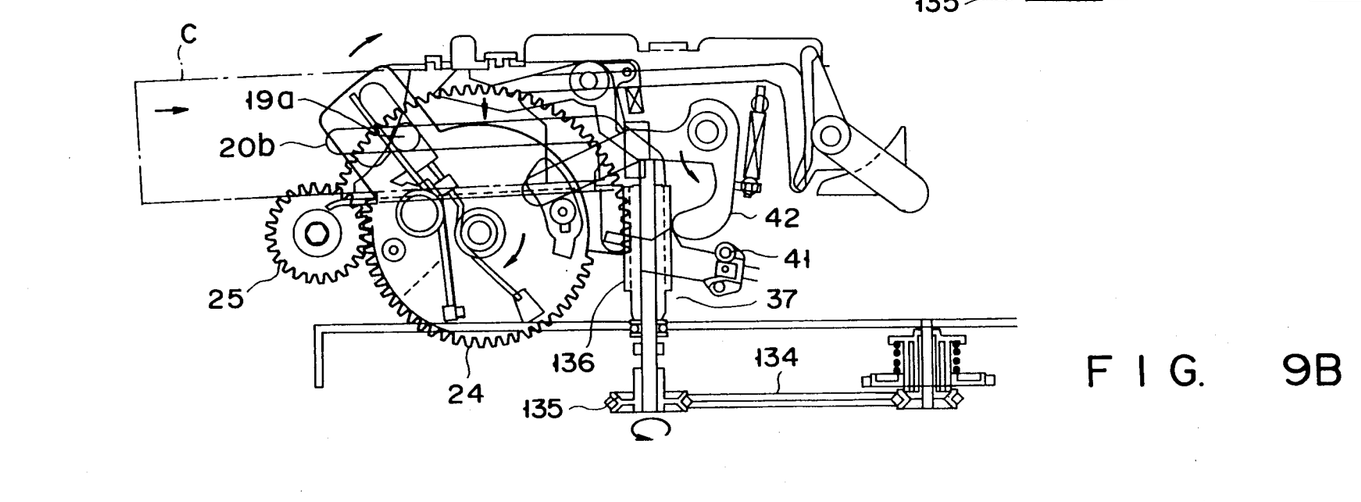
Figure 9C:
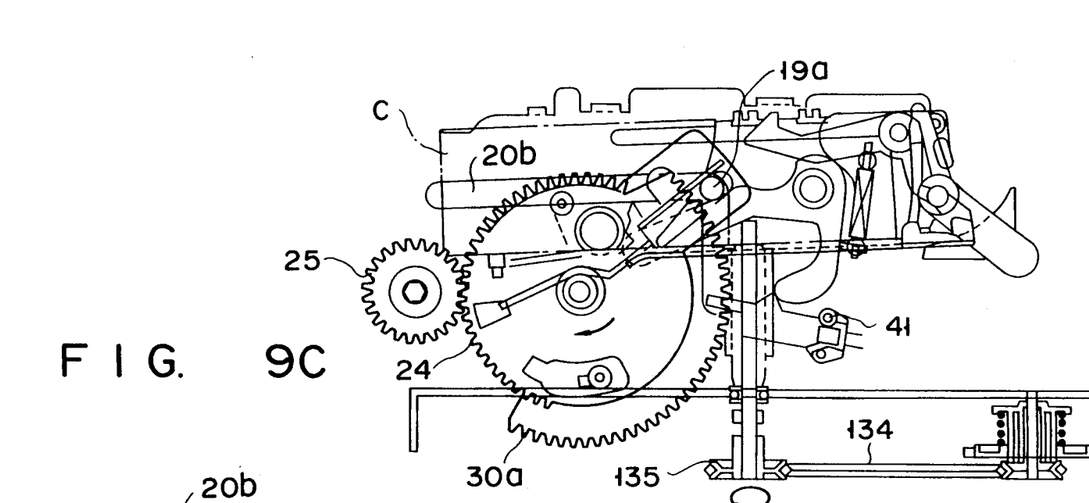
Figure 9D:
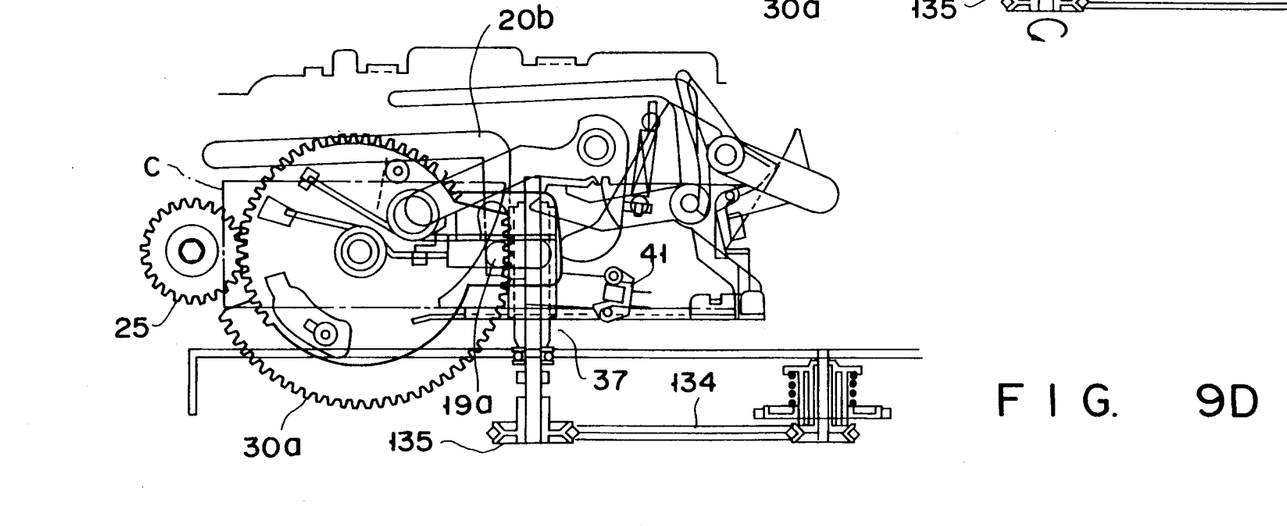

As further shown in FIG. 6, a switch 41 and a switching member 42 for cassette position detection are arranged at the mounting member 38 to correspond to each other. The switching member 42 is arranged to obtain a counterclockwise biasing force in FIG. 8 through a spring 43, and its one end opposes a driven unit 41a of the switch 41. One end of the switching member 42 opposes the driven unit 41a of the switch 41. A drive unit 44 formed on the loading gear 24 opposes the other end of the switching member 42. The switching member 42 is driven at the cassette insertion position determined by the cassette holder 112 through the drive unit 44 of the first loading gear 24 to control the switching operation of the switch 41. In addition, the driven unit 41a of the switch 41 is arranged to correspond approximately to the end portion of the guide hole 20b of the second support plate 11, and its switching operation is controlled through the guide pin 19b of the second side plate 16 after the cassette holder 112 reaches the tape drive unit. As shown in FIG. 9A, therefore, when the tape cassette C is inserted in the cassette holder 112, the cassette holder 112 is moved in the cassette insertion direction, and the first loading gear 24 is pivoted clockwise. Therefore, the switch 41 is turned on through the drive unit 44 of the first loading gear 24 and the switching member 42. As shown in FIG. 9B, when the switch 41 is turned on, drive force from the capstan motor 127 serving as a drive source is transmitted to the worm 136 and the third loading gear 30 through the transmission belt 134. As described above, this drive force is further transmitted to the first and second loading gears 24 and 29, thus loading the cassette holder 112 (FIG. 9C). As shown in FIG. 9D, when the cassette holder 112 reaches the tape drive unit, the switch 41 is turned off by the guide pin 19b of the cassette holder 112, and the transmission of the drive force from the capstan motor 127 is stopped at this time. Then, when an ejection operation is performed and the capstan motor 127 is reversed, the worm 136, the third loading gear 30, and the first and second loading gears 24 and 29 are reversed upon this reverse rotation of the motor 127. The cassette holder 112 is unloaded and conveyed to a cassette unloading position at which the tape cassette is ejected by a user. At this time, the switching member 42 is pivotally biased clockwise in FIG. 9D against a spring force of the spring 43 to the drive unit 44 of the first loading gear 24, and the switching operation of the switch 41 is controlled. At this time, the transmission of the drive force from the capstan motor 127 is stopped.

Thus, in the above-mentioned cassette loading apparatus, the pulley 135 to which a drive force is transmitted is coaxially fitted on one end of the shaft 34 of the loading driving worm 136 to constitute the worm unit 37 in which the intermediate portion of the shaft 34 is axially supported by the thrust and radial bearings 35 and 36. In addition, the thrust bearing 35 of the worm unit 37 has a friction coefficient smaller than those of the first and second elastic support members 39 and 40 for detachably holding the other end of the shaft 34 and the radial bearing 36. Therefore, after the worm unit 37 is inserted against the elasticity of the first and second elastic support members 39 and 40 arranged in the mounting member 38, only the gear unit 30a of the third loading gear 30 is meshed with the worm 136 to complete assembly, thus simplifying an assembly operation. Therefore, for example, when the transmission of the cassette holder 112 is forcibly stopped by a user during an unloading operation after the cassette holder 112 is loaded, a very large torque acts on the worm 136. However, a cling between the worm 136 and the gear unit 30a of the third loading gear 30, or the worm 136 and the first and second elastic support members 39 and 40 caused by the large torque is prevented by a function of the thrust bearing 35. Therefore, reliable operation control can be realized using a small drive force from the capstan motor 127 corresponding to a starting torque during a loading operation, thus saving power.

Note that, in the above embodiment, the second support plate 11, of the first and second support plates 10 and 11, for holding the cassette holder 112 to guide it is disposed as a mounting body on which the mounting member 38 with the worm unit holding first and second elastic support members 39 and 40 is mounted. However, the present invention is not limited to this arrangement. For example, the mounting member 38 can be directly mounted on the chassis (not shown) for supporting the first and second support plates 10 and 11.

Although the first and second elastic support members 39 and 40 are integrally formed in the above embodiment, the present invention is not limited thereto, and these members 39 and 40 can be individually formed.

The present invention, therefore, is not limited to the above embodiment, and various changes and modifications may be made without departing from the spirit and scope of the present invention.

As has been described above in detail, according to the present invention, there is provided a cassette loading apparatus in which reliable operation control can be realized using a motor having a small drive force, and assembly and mounting operations of the worm can be simplified, thus achieving preferable cost and power consumption.

What is claimed is:

1. An apparatus for performing a loading and unloading operation of a cassette, comprising:
   a cassette holder, disposed to be substantially horizontally movable, for holding the cassette;
   loading means, including a guide member, for guiding said cassette holder during the loading or unloading of said cassette, and a worm wheel, for driving said guide member;
   a worm unit, including:
      a worm meshed with said worm wheel,
      a rotating member coaxially mounted at one end of said worm, and
      thrust said radial bearings coaxially mounted between said worm and said rotating member, said worm being driven according to a transmission of rotation from a driven source to said rotating member;
   means for mounting said worm unit, including:
      a first support member for detachably supporting another end of said worm,
      a second support member for detachably supporting said radial bearing, and
      a mounting member in which said first and second support members are integrally formed, and wherein said thrust bearing has a friction coefficient that is less than a friction coefficient by which the first and second support members hold said worm and said radial bearing.

2. An apparatus according to claim 1, wherein said rotating member includes a pulley comprising a belt transmission mechanism.

3. An apparatus according to claim 2, wherein a capstan motor serves to a drive source for rotating the pulley.

* * * * *